United States Patent
Rueter et al.

(10) Patent No.: US 12,521,203 B2
(45) Date of Patent: Jan. 13, 2026

(54) AUTOMATED METHOD FOR THE EFFECTIVE FIXATION OF X-RAY MARKERS IN VASCULAR IMPLANTS

(71) Applicant: CORTRONIK GmbH, Rostock-Warnemünde (DE)

(72) Inventors: Bjoern Rueter, Ostseebad Nienhagen (DE); Ullrich Bayer, Bad Doberan (DE); Iris Kirchner, Rostock (DE); Sabine Illner, Rostock (DE); Thomas Eickner, Rostock (DE); Niels Grabow, Rostock (DE); Klaus-Peter Schmitz, Rostock (DE)

(73) Assignee: CORTRONIK GmbH, Rostock-Warnemünde (DE)

( * ) Notice: Subject to any disclaimer, the term of this patent is extended or adjusted under 35 U.S.C. 154(b) by 376 days.

(21) Appl. No.: 18/246,275

(22) PCT Filed: Oct. 4, 2021

(86) PCT No.: PCT/EP2021/077252
§ 371 (c)(1),
(2) Date: Mar. 22, 2023

(87) PCT Pub. No.: WO2022/084013
PCT Pub. Date: Apr. 28, 2022

(65) Prior Publication Data
US 2023/0346508 A1   Nov. 2, 2023

(30) Foreign Application Priority Data
Oct. 23, 2020 (DE) ...................... 10 2020 127 978.7
Jan. 11, 2021 (EP) ..................................... 21150883

(51) Int. Cl.
*A61B 90/00* (2016.01)

(52) U.S. Cl.
CPC ........ *A61B 90/39* (2016.02); *A61B 2090/392* (2016.02); *A61B 2090/3987* (2016.02); *A61B 2090/3991* (2016.02)

(58) Field of Classification Search
CPC ........ A61F 2/82; A61L 31/046; A61L 24/106; A61L 31/18; A61B 90/39; A61B 2090/3904–3995
See application file for complete search history.

(56) References Cited

U.S. PATENT DOCUMENTS 5,582,596 A * 12/1996 Fukunaga ........... A61L 26/0061
                                                                 604/82
2002/0103528 A1 * 8/2002 Schaldach .............. A61B 90/39
                                                                 623/1.34

(Continued)

FOREIGN PATENT DOCUMENTS

| EP | 3281648 A1 * | 2/2018 | ............. A61B 90/39 |
| EP | 3348239 A1 * | 7/2018 | ............. A61B 90/39 |
| WO | 98/17202 A1 | 4/1998 | |

OTHER PUBLICATIONS

Radosevich et al. Fibrin Sealant: Scientific Rationale, Production Methods, Properties, and Current Clinical Use. Vox Sang. (1997). 72:133-143. (Year: 1997).*

(Continued)

*Primary Examiner* — Anh Tuan T Nguyen
*Assistant Examiner* — Younhee Choi
(74) *Attorney, Agent, or Firm* — Greer, Burns & Crain, Ltd.; Steven P. Fallon

(57) ABSTRACT

A method for connecting an X-ray marker to a medical implant includes providing a medical implant having an opening for receiving the X-ray marker. An X-ray marker is (Continued)

provided. The X-ray marker is glued into the opening with a liquid adhesive that includes at least one first component including a fibrinogen.

14 Claims, 7 Drawing Sheets

(56) References Cited

U.S. PATENT DOCUMENTS

| | | | |
|---|---|---|---|
| 2007/0156230 A1* | 7/2007 | Dugan | A61F 2/86 623/1.34 |
| 2012/0144663 A1* | 6/2012 | Wu | A61F 2/82 29/700 |
| 2012/0150281 A1* | 6/2012 | Klocke | A61L 31/022 623/1.42 |
| 2013/0325059 A1* | 12/2013 | O'Neill | A61M 11/007 606/213 |
| 2019/0321128 A1* | 10/2019 | Risch | A61F 2/82 |

OTHER PUBLICATIONS

Vu et al. Batroxobin Binds Fibrin with Higher Affinity and Promotes Clot Expansion to a Greater Extent than Thrombin. J Biol Chem. (2013). 288(23):16862-16871. doi: 10.1074/jbc. M113.464750. (Year: 2013).*

International Search Report from the corresponding International Patent Application No. PCT/EP2021/077252, dated Jan. 12, 2022.

* cited by examiner

AUTOMATED METHOD FOR THE EFFECTIVE FIXATION OF X-RAY MARKERS IN VASCULAR IMPLANTS

PRIORITY CLAIM

This application is a 35 U.S.C. 371 US National Phase and claims priority under 35 U.S.C. § 119, 35 U.S.C. 365(b) and all applicable statutes and treaties from prior PCT Application PCT/EP2021/077252, which was filed Oct. 4, 2021, which application claimed priority from European Application Serial Number 21150883.3, which was filed Jan. 11, 2021 and from German Application No. 10 2020 127 978.7

FIELD OF THE INVENTION

The invention concerns X-ray markers for vascular implants.

BACKGROUND

Solid markers made of non-resorbable metals are integrated in medical implants, particularly vascular implants, for example, in the form of resorbable scaffolds. The solid markers are used due to inadequate X-ray visibility of the resorbable scaffolds.

In order to ensure good X-ray visibility, these X-ray markers must be made of an excellent X-ray absorbing material. The number of metals that can be used therefor is limited, particularly for resorbable scaffold materials such as magnesium alloys. This limitation results from the possibility of metal/metal contact between the scaffold and the X-ray marker material. The formation of a local element and an undesired accelerated degradation of the scaffold would be the result. One option for avoiding this is to use X-ray absorbing metals such as tantalum, which have a dense oxide layer that acts as a dielectric and thus prevents direct metal/metal contact. In the event that their effect is insufficient, a minimum distance can be achieved by adapted adhesive technologies and thus a higher level of security against the occurrence of such undesirable effects.

However, such adhesive technologies are still subject to a number of restrictions. These include, on the one hand, biocompatibility and, on the other hand, the requirement for the smallest possible amount of adhesive with a high marker holding force to be achieved at the same time, which is intended to prevent the marker from prematurely detaching from the scaffold composite when the catheter system is mechanically stressed. There is a requirement to design the amount of adhesive to be used such that, on the one hand, it leads to the highest possible holding force of the X-ray marker in the scaffold composite. On the other hand, an overdose should be avoided as far as possible for medical reasons. This results in the requirement for a quantity-based dosage, which is extremely difficult to implement due to to the geometric dimensions of the adhesive gap.

Regardless of the previously described methods with which X-ray markers are connected to the rest of the scaffold in a form-fitting, material-locking or force-fitting manner, it cannot be ruled out that this marker will become detached from the scaffold composite after the scaffold has been dilated in the vessel. Patient risk is the result if this occurs at a relatively early point in time at which the marker or the scaffold region around the marker has not yet been sufficiently firmly absorbed by the vessel wall. This manifests itself in the fact that the marker is captured by the blood flow, carried away and can close smaller downstream vascular lumens. The associated risk of thrombosis increases significantly as a result.

So far, this task has been solved with the help of a medically approved, biocompatible but non-resorbable silicone adhesive NUSIL MED 2-4213. This has a relatively high dynamic viscosity under the specific processing conditions (room temperature). This can lead to disadvantages in the manufacturing process. These express themselves, among other things, in more difficult dosing.

Due to the technologically demanding micro-geometry of the scaffold environment, particularly an opening or eyelet of the implant or scaffold, which opening or eyelet is intended for fixing the X-ray marker, the adhesive is often applied through cannulas, wherein, however, due to the high processing viscosity of the silicone adhesive, cannula inner diameters regularly lead to an overdose and a leakage of the adhesive from the glue joint.

SUMMARY OF THE INVENTION

A preferred method for connecting an X-ray marker to a medical includes steps of
 providing a medical implant, the implant having an opening for receiving the X-ray marker,
 providing an X-ray marker, and
 gluing the X-ray marker into the opening of the medical implant with a liquid adhesive which includes at least one first component including a fibrinogen.

The opening can be a through opening of the implant, which is also referred to as an eyelet.

BRIEF DESCRIPTION OF THE DRAWINGS

In the following, embodiments of the method according to the invention and further features and advantages of the invention are to be explained with reference to the figures. Shown are.

DETAILED DESCRIPTION OF THE PREFERRED EMBODIMENTS

Figure 1:
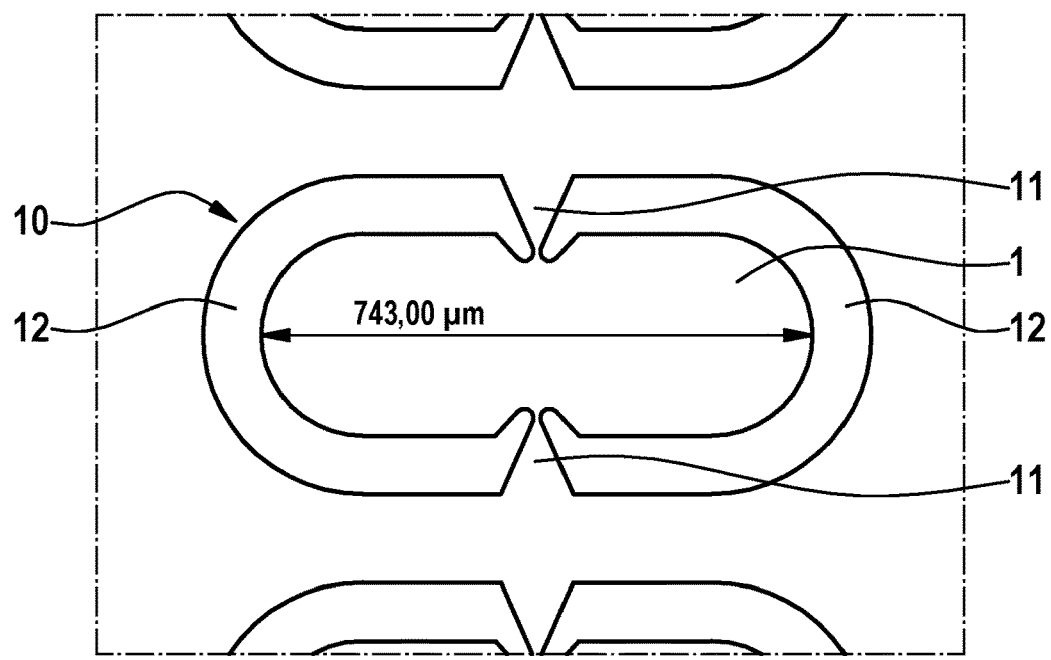
FIG. 1 shows a microscopic image of an X-ray marker which is cut from a tubular blank and is connected to the blank via two predetermined breaking points so that the X-ray marker is ready for arrangement in an opening of the medical implant (for example, scaffold)

The fixation according to the invention of X-ray markers, particularly in resorbable scaffolds, is carried out using a preferably bioresorbable fibrin adhesive, the at least one first component of which preferably has coagulable human fibrinogen.

According to one embodiment, the medical implant is a vascular implant, particularly a vascular support made of a resorbable magnesium alloy. Such a vascular support is also referred to as a scaffold and can form a circumferential framework that consists of a plurality of interconnected struts. The opening can be formed in a strut.

According to one embodiment of the invention, which is described in detail below, the adhesive can have a second component which contains thrombin, preferably human thrombin. If the two components are mixed together, coagulation occurs immediately. In a preferred embodiment of the method described herein, the first component and the second component are supplied separately from one another, in parallel, and accordingly mixed at the place of use.

Surprisingly, it has been found that an adhesive which only has the first component reacts with metals, such as magnesium, and hardens even without the addition of thrombin or the second component, which considerably simplifies the application or processing of the adhesive. According to a preferred variant of the invention, the adhesive is therefore free from thrombin or has only the first component. In this sense, the adhesive is accordingly a one-component adhesive.

By the adhesive according to the invention, there is the possibility of avoiding non-resorbable adhesives, such as, for example, NUSIL MED 2-4213, or of minimizing their use.

The invention makes this possible particularly through the use of a bioresorbable fibrinogen-containing adhesive, which advantageously simultaneously enables automated X-ray marker assembly.

In summary, the method according to the invention advantageously allows the proportion of non-degradable components in resorbable vascular implants or implant systems to be reduced, an improvement in the ingrowth process of non-degradable X-ray markers during and after the degradation of the scaffold has been completed, a prevention of overdosing of adhesives during marker assembly and a process improvement and/or automation of marker to assembly.

According to one embodiment of the method, it is provided that the step of providing the X-ray marker further includes the X-ray marker being separated from a blank, preferably by laser cutting. According to a preferred embodiment of the invention it is provided for the is blank to be tubular in form. This also makes it possible, among other things, to give the X-ray marker a surface curvature which is adapted to a curvature of the implant or scaffold in a circumferential direction of the implant. Furthermore, such a tubular blank can be processed efficiently by laser cutting. Alternatively, a blank in the form of a plate or film made from the material of the X-ray marker can also be expedient.

Furthermore, according to one embodiment of the method, it is provided that the step of gluing in the X-ray marker includes the first component of the adhesive being applied to the medical implant in the region of the opening of the medical implant and then the X-ray marker being arranged in the opening.

According to one embodiment of the method, it is preferably provided for the first component of the adhesive to be applied to the medical implant such that the adhesive fills or completely wets the opening of the medical implant.

Furthermore, according to one embodiment of the method, it is provided that the step of gluing in the X-ray marker includes the first component of the adhesive being applied through a cannula, particularly such that the opening of the medical implant is completely filled or wetted.

The arrangement of the X-ray marker in the opening of the medical implant can be carried out manually. The adhesive can also be applied manually (for example, through the cannula). As an alternative to this, the method according to the invention, particularly the arrangement of the X-ray marker in the opening of the medical implant and/or the application of the adhesive or the first and optionally the second component (see also below), can also be automated.

Furthermore, according to one embodiment of the method, it is provided that the step of providing the X-ray marker includes the X-ray marker being cut in sections from a blank, preferably by laser cutting, so that at least one gap is created in the blank that separates the X-ray marker from the blank, wherein the X-ray marker is connected to the blank via at least one predetermined breaking point. According to an embodiment of the invention it is provided for the blank to be tubular in form. Particularly, according to one embodiment, it is provided that the X-ray marker is cut from the blank in sections, particularly by laser cutting, that the X-ray marker is connected to the blank via two opposing predetermined breaking points, that is, particularly is separated from the blank by two gaps that extend between the predetermined breaking points. The first and/or second component of the adhesive or the adhesive can then optionally be applied to the two gaps, for example, through a cannula.

Furthermore, according to one embodiment of the method, it is provided that the step of gluing in the X-ray marker includes the first component of the adhesive being applied in one of the following ways: applying the first component of the adhesive to the blank by immersing the blank in the first component of the adhesive, applying the adhesive into the at least one gap (or both gaps, see above), applying the adhesive into the opening of the medical implant, namely preferably so that the opening is completely filled by the first component of the component or the adhesive. The application described here can also be carried out using more than one component. If more than one component is applied, it can be advantageous if the components are applied parallel to one another without prior mixing.

Furthermore, according to one embodiment of the method, it is provided that the step of providing the medical implant includes the medical implant being drawn onto a dilatable balloon which is used to avoid plastic deformation of the medical implant or scaffold, wherein the balloon is pressurized so that it presses with an outer surface against an inner surface of the medical implant.

According to one embodiment of the invention, it is further provided that the outer surface is designed such that it does not enter into an adhesive connection with the first component of the adhesive or with the adhesive. The outer surface can particularly be formed by a non-stick coating, particularly with regard to the first component of the adhesive.

Furthermore, according to one embodiment of the method, it is provided that the step of gluing in the X-ray marker includes the balloon with the medical implant arranged thereon being arranged in the blank so that the opening of the medical implant is opposite the X-ray marker. For this purpose, a positioning aid can be used, and that the X-ray marker is pressed into the opening while cutting through the at least one predetermined breaking point (particularly the two predetermined breaking points) so that the X-ray marker is arranged in the opening of the medical implant and the first component of the adhesive or the adhesive contacted. For example, a software-based recognition system having optical sensors could be used as a positioning aid.

Furthermore, according to one embodiment of the invention, it is provided that a stamp is used to press the X-ray marker into the opening of the medical implant.

Furthermore, according to one embodiment of the invention, it is provided that the balloon with the medical implant is guided out of the blank after the first component or the adhesive has been applied to the medical implant and/or to the blank and/or to the X-ray marker.

Furthermore, according to one embodiment of the method, it is provided that the step of gluing in the X-ray marker includes the adhesive having a second component including a thrombin. There is therefore a basic variant of the method according to the invention and a further variant. In the first variant, the adhesive preferably only has the first component, which contains fibrinogen, preferably in an aqueous solution. In the further variant, the adhesive has a second component which contains thrombin, particularly in an aqueous solution. All of the embodiments described herein can basically be used with both adhesive variants, wherein there is the possibility of applying the first and second components together or one after the other, that is, first the first component and then the second component to accelerate the hardening of the adhesive formed from the two components. Furthermore, a parallel application of both components is advantageous, particularly via two separate feed paths.

Accordingly, according to one embodiment of the method, it is provided that the second component is applied together with the first component, or that the second component is added to the first component after the X-ray marker has been arranged in the opening of the medical implant (particularly after the medical implant has been guided out of the blank) to accelerate the hardening of the adhesive.

Furthermore, according to one embodiment of the method, it is provided that the first component of the adhesive is applied together or in parallel with the second component of the adhesive via two, preferably parallel, cannulas, particularly in the region of the opening of the medical implant or into the opening of the medical implant or in the at least one gap (or the two gaps), or that the second component is subsequently added to the first component via a cannula.

According to one embodiment, the present invention preferably uses a low-viscosity and resorbable adhesive which enables high-precision dosing while simultaneously minimizing superfluous amounts of adhesive in the vicinity between the X-ray marker and the medical implant/scaffold. This considerably facilitates the automation of the X-ray marker assembly. Furthermore, the adhesive used increases biocompatibility and increases the rate of growth of the X-ray marker into the vessel wall.

The adhesive used according to the invention advantageously allows the use of a cannula having the smallest possible inner diameter of an opening in the cannula through which the adhesive or the first and/or the second component is dispensed or applied. However, only relatively low viscosity adhesives can be processed with small inner cannula diameters. Highly viscous adhesives require pressures that do not allow continuous adhesive application over the duration of the dosing process.

It is therefore advantageous to set an optimum between said inner diameter of the opening of the cannula and the adhesive viscosity. All the more so since when a critical ratio of the inner cannula surface to the surrounding adhesive volume is exceeded, hardening mechanisms can already be set in motion, which should only take place after the actual bonding process (catalytic effect of the cannula, which is usually made of rust- and acid-resistant steel).

According to a preferred embodiment of the method, it is provided that the cannula which is used to apply the first and/or the second component of the adhesive has an opening which has an inner diameter which lies in the range from 50 to 120 μm. Particularly, a common cannula can be used to apply the first and the second component of the adhesive, or two separate cannulas, which then each have openings having the same inner diameter, which can assume the above-mentioned values, for example.

Furthermore, according to one embodiment of the method, it is provided that the first component of the adhesive has a dynamic viscosity in the range from 10 to 1000 mPas.

Furthermore, according to one embodiment of the invention, it is provided that the second component of the adhesive, if present, has a dynamic viscosity in the range from 1 to 1000 mPas.

According to a particularly preferred embodiment of the method, it is provided that the adhesive is free from thrombin, wherein the first component particularly does not have any thrombin. The thrombin-free adhesive preferably only has the first component. Surprisingly, it has been shown that the adhesive having the fibrinogen-containing (first) component also hardens reliably without the addition of thrombin.

Furthermore, it is provided according to one embodiment that the balloon is deflated after the adhesive has hardened and is guided out of the medical implant. This method step can be used for both the thrombin-free and the thrombin-containing adhesive.

According to one embodiment of the invention, it is provided that the first component of the adhesive includes one or more of the following substances:
fibrinogen, preferably human fibrinogen,
arginine hydrochloride,
glycine,
sodium chloride,
sodium citrate,
calcium chloride,
water.

According to one embodiment of the method, it is preferably provided that the fibrinogen or human fibrinogen is present in the first component in aqueous solution with a concentration of 50 mg/mL to 90 mg/mL.

Furthermore, according to one embodiment of the invention, it is provided that the second component of the adhesive, if present, has one or more of the following substances:
thrombin, preferably human thrombin,
calcium chloride,
albumin, preferably human albumin,
mannitol,
sodium acetate,
water.

According to one embodiment, it is preferably provided that the thrombin or human thrombin is present in the second component in aqueous solution with a concentration of 10 IU/mL to 1200 IU/mL, especially 800 IU/mL to 1200 IU/mL.

Furthermore, according to a preferred embodiment of the invention, it is provided that the X-ray marker has tantalum or consists of tantalum. Furthermore, according to a preferred embodiment, it is provided that the blank has tantalum or consists of tantalum. According to one embodiment, a tantalum alloy can be used.

Furthermore, one aspect of the present invention relates to a medical implant, particularly a vascular implant, particularly a scaffold, which has been produced using the method according to the invention.

Furthermore, a further aspect of the invention relates to a medical implant, particularly a vascular implant, particularly a scaffold, wherein the medical implant has a support structure which is formed from a magnesium alloy, wherein the support structure preferably has a plurality of interconnected struts, and wherein an X-ray marker is connected to the support structure by an adhesive which has fibrin and/or which is thrombin-free.

With reference to FIG. 1, the present invention relates to a method for connecting an X-ray marker 1 to a medical implant 2, including at least the steps:
providing a medical implant 2, the implant having an opening 3 for receiving the X-ray marker 1,
providing an X-ray marker 1, and
gluing the X-ray marker 1 into the opening 3 of the medical implant 2 by a liquid adhesive 4 which includes at least one first component 41 including a fibrinogen.

According to one embodiment, the adhesive can have a second thrombin-containing component 42. According to one embodiment, however, the adhesive 4 can also be free from thrombin and then accordingly has only one fibrinogen-containing component 41.

Figure 2:
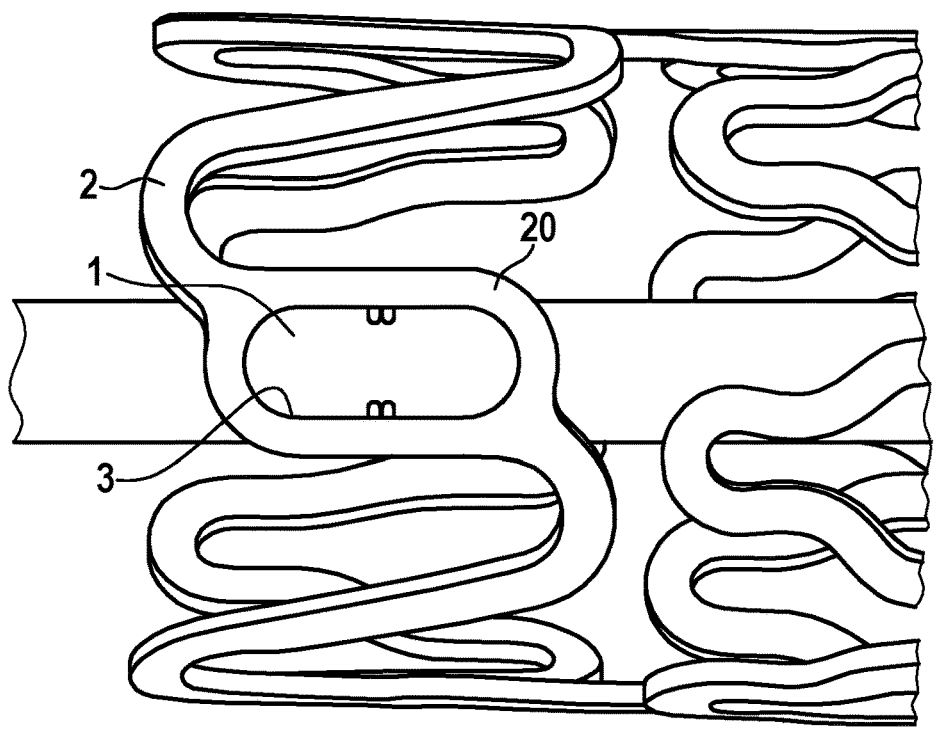
FIG. 2 shows a scanning electron microscope image of an X-ray marker glued to the implant, here in the form of a scaffold, according to the type of FIG. 1.

According to FIG. 2, the medical implant 2 can be, for example, a vascular implant in the form of a vascular support (also referred to as a scaffold), which forms a circumferential support structure from a plurality of interconnected struts 20. Said opening 3 can be formed in one of the struts 20. The scaffold 2 is preferably formed from a magnesium alloy which is broken down or resorbed in the patient's body after implantation.

The X-ray marker 1, which is shown in the glued-in state in FIG. 2, can be provided according to FIG. 1 by a tubular blank 10, from which the X-ray marker 1 is cut out in sections, preferably by laser cutting, wherein the X-ray marker 1 is connected to the blank 10 via at least one, here two web-shaped predetermined breaking points 11. The X-ray marker 1 is now separated from the rest of the blank 10 by the gaps 12 running between the predetermined breaking points 11 and can be separated from the blank 10 by cutting through the predetermined breaking points 11. This can be done, for example, by exerting pressure on the X-ray marker in the radial direction of the blank 10.

A low-viscosity, resorbable fibrinogen-based adhesive is preferably used to glue the X-ray marker 1 into the opening 3 of the implant 2, which is also referred to as an eyelet 3. In addition to a fibrinogen-containing first component, the adhesive can also have a thrombin-containing second component as a further constituent. Human fibrinogen or human thrombin is preferably used.

The fibrin formed from the fibrinogen advantageously promotes the growth of the X-ray marker 1 into the vascular wall of the patient over all phases of the degradation process of the scaffold or implant 2. Fibrin is bioresorbable and thus reduces the amount of non-resorbable scaffold constituents (only the X-ray marker itself remains in the body).

Figure 3A:
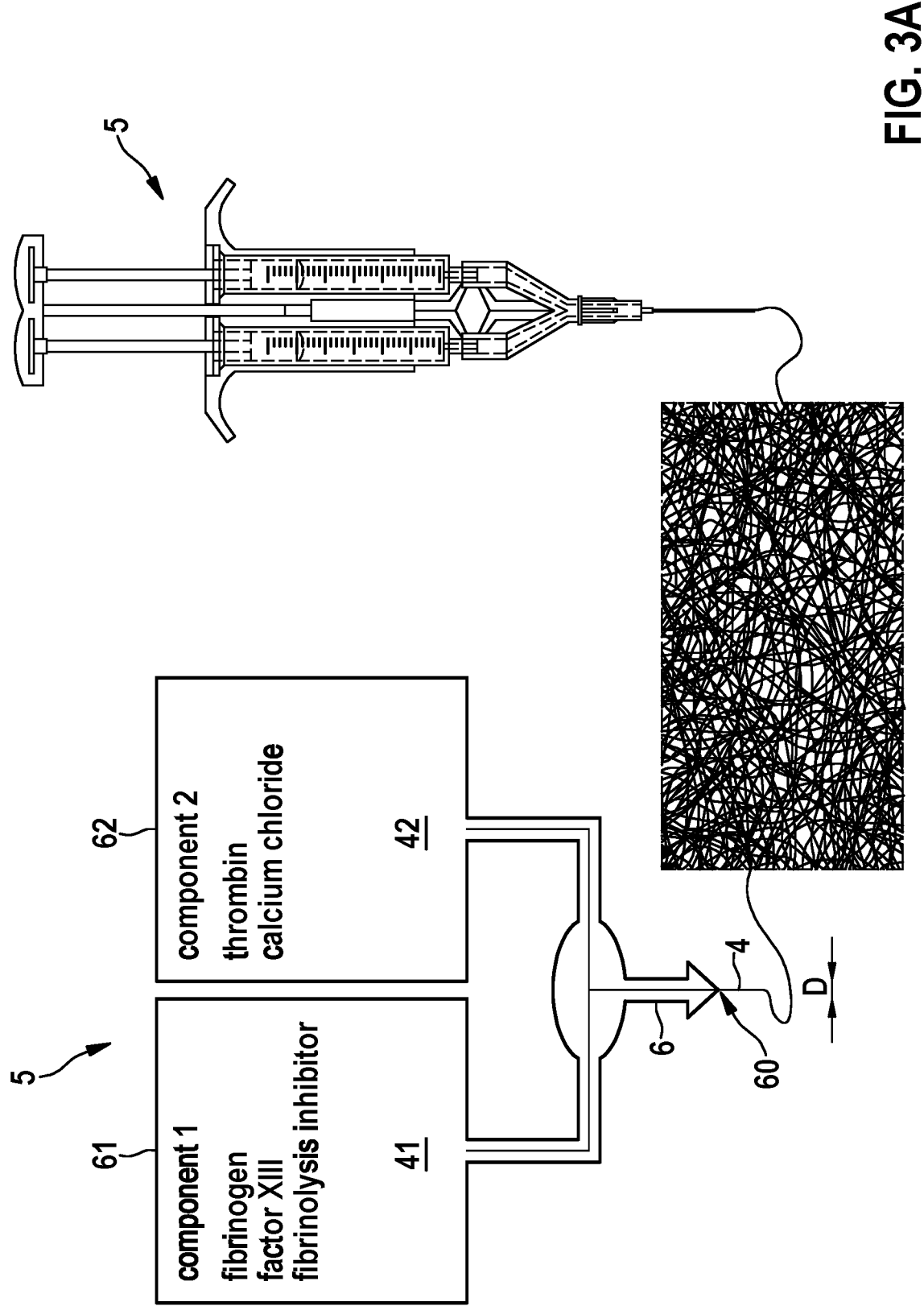
FIG. 3A/B show devices for applying the adhesive according to an embodiment of the invention, wherein the adhesive can have a first fibrinogen-containing component and a second thrombin-containing component.

The low viscosity enables the use of a device 5 for dispensing the first and/or second component 41, 42 of the adhesive 4, which has a cannula 6 having an opening 60 for dispensing the adhesive 4 or the first and/or second component 41, 42, which has a comparatively small inner diameter D, which preferably lies in the range from 20 to 120 μm. Embodiments of such a device 5 are shown in FIG. 3A/B. Here, the device can have two separate containers 61, 62 (for example, in the form of syringes) for storing the first and second components 41, 42 of the adhesive 4, wherein the two components can be dispensed simultaneously or one after the other via the common cannula 6, which is in flow connection with both containers 61, 62. The two components 41, 42 of the adhesive 4 can be mixed in the cannula 6. The first component 41 can contain, for example, fibrinogen, factor XIII and a fibrinolysis inhibitor, whereas the second component 42 can contain, for example, thrombin and calcium chloride.

Such a small cannula inner diameter D makes it possible for there to be no overdosing beyond the adhesive gap. Furthermore, such a small inner cannula diameter D enables the adhesive 4 or the respective component 41, 42 to be precisely positioned in the cut edges of the eyelet 3 of the implant 2. In the event that the adhesive only has the first component 41 or no thrombin, the device 5 accordingly has only one container 61 for the fibrinogen-containing component 41.

The X-ray marker is particularly preferably made of tantalum and is cut from a tantalum tube 10 by laser cutting technology (see FIG. 1). The predetermined breaking points 11 described above have a material bond with said tantalum tube or blank 10 up to the point in time when the X-ray marker is assembled.

As an alternative to using a cannula, the adhesive 4, especially if it only has the first component 41 or has no thrombin, can be applied by immersing the entire blank (for example, tantalum tube) in the first fibrinogen-containing component (which can be, for example, an aqueous solution) or to completely wet all gaps 12 or to fill them with the first component or the adhesive and thus avoid the process step of dosing by a cannula.

According to one embodiment, the mechanical stability of said predetermined breaking points 11 is dimensioned such that it detaches the X-ray marker 1 from the blank 10 by a low mechanical pressure, which acts on the X-ray marker surface, for example, via a stamp.

Before the process of detaching the X-ray marker 1, the implant 2 (particularly scaffold) can be positioned inside the blank 10 or tantalum tube such that the eyelet 3 is located exactly below the X-ray marker 1, that is, opposite this, for example, in the radial direction of the tubular blank 10.

A defined amount of adhesive 4, which has the first component 41 and optionally also the second component 42 (if present), is guided around an X-ray marker cut edge. The X-ray marker 1, defined in this way and wetted with adhesive 4, can then (as described above) be pressed into the eyelet 3. Overdosing with adhesive 4 is avoided by selecting the cannula inner diameter D and the given adhesive viscosity as described above.

In order to prevent plastic deformation of the implant or scaffold 2, it can be drawn onto a dilatable balloon beforehand. This balloon has a coating or surface that acts as a non-stick layer opposite the adhesive 4 or at least the first component 41. This is characterized by a resulting high surface tension compared to the adhesive 4 or at least the first component 41, which, when wetted with the adhesive 4 or the first component 41 of the adhesive, is represented by a contact angle that is above 120°. The non-stick layer or non-stick surface can be produced, for example, by treating the balloon by an atmospheric pressure plasma process. A plasma treatment is carried out in a treatment chamber, during which a silane-containing gaseous precursor is ionized by the plasma under normal pressure (1013 mbar). As a result of the coating, a thin silicon oxide-containing layer of only a few nanometers (nm) is deposited on the balloon surface, which is characterized, on the one hand, by high dilatability and, on the other hand, by the above-mentioned non-stick property to the adhesive 4 or at least the first component 41. The non-stick effect is based on a nanoscale surface structure of the balloon material (preferably polyamide 12). Alternatively, the coating can be carried out by a dip-coating process that takes place in a silane-containing solution.

Figure 4:
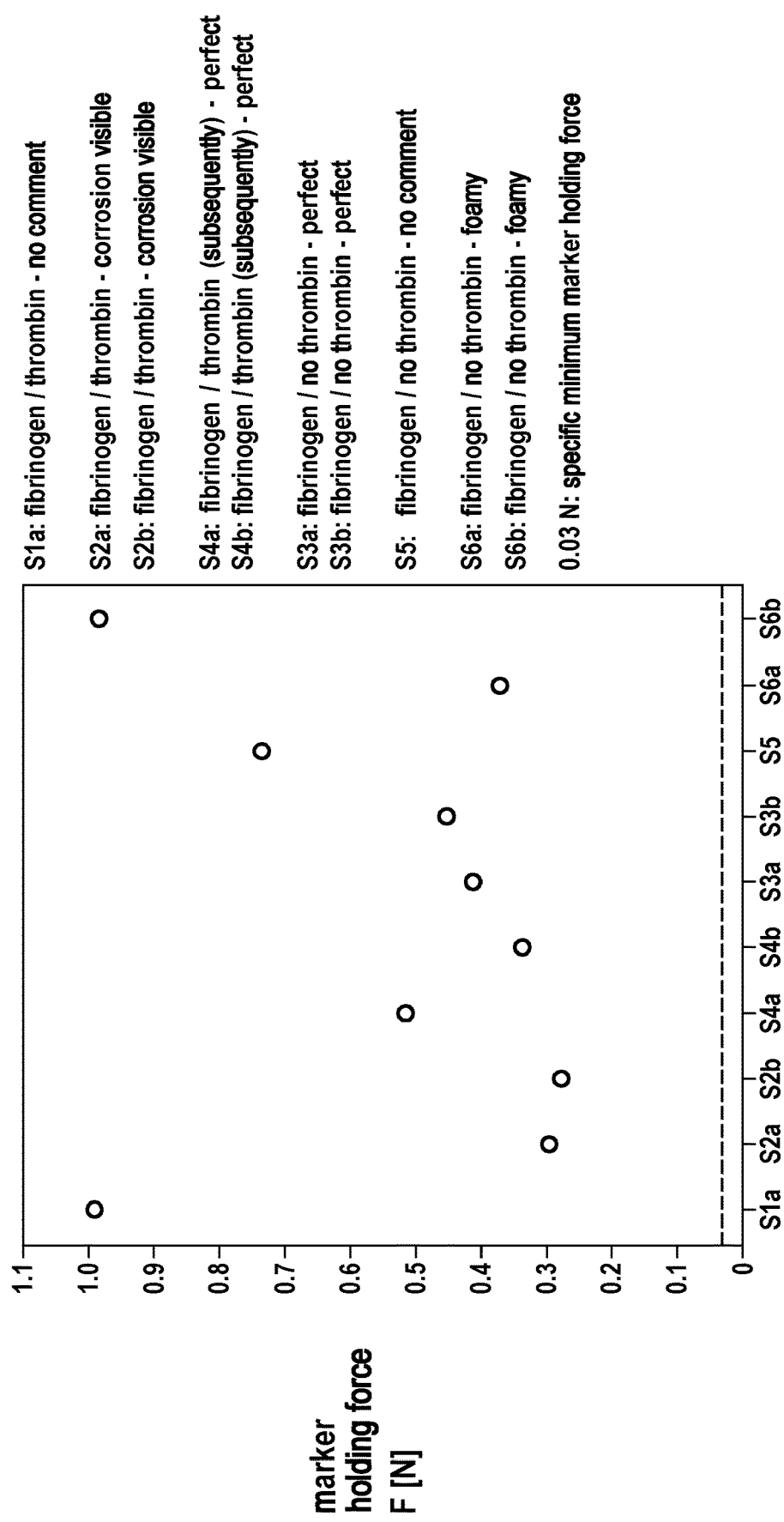
FIG. 4 shows measurement data for the holding force of an X-ray marker glued in using an adhesive containing fibrinogen, wherein adhesives with and without thrombin were tested.

The balloon is pressurized and is pressed into the inner surface of the scaffold 2. A template-like positioning aid specific for each scaffold design ensures that the eyelet 3 is located exactly under a marker opening or an X-ray marker 1. The X-ray marker can be pressed out of the tube 10 into the eyelet 3 located underneath, for example, by a stamp. The balloon with the scaffold 2 is then guided out of the tantalum tube 10. The adhesive 4 hardens and creates the adhesive bond between the X-ray marker 1 and the scaffold 2. The criterion for the holding force is a minimum stamping force of 0.03 N. FIG. 4 shows the marker holding forces determined for various adhesives 4, each of which is greater than 0.03 N.

Finally, the balloon is deflated and pulled out of the scaffold 2. The non-stick layer or surface prevents fibrinogen from being carried over onto the strut surfaces on the inside of the scaffold.

Figure 3B:
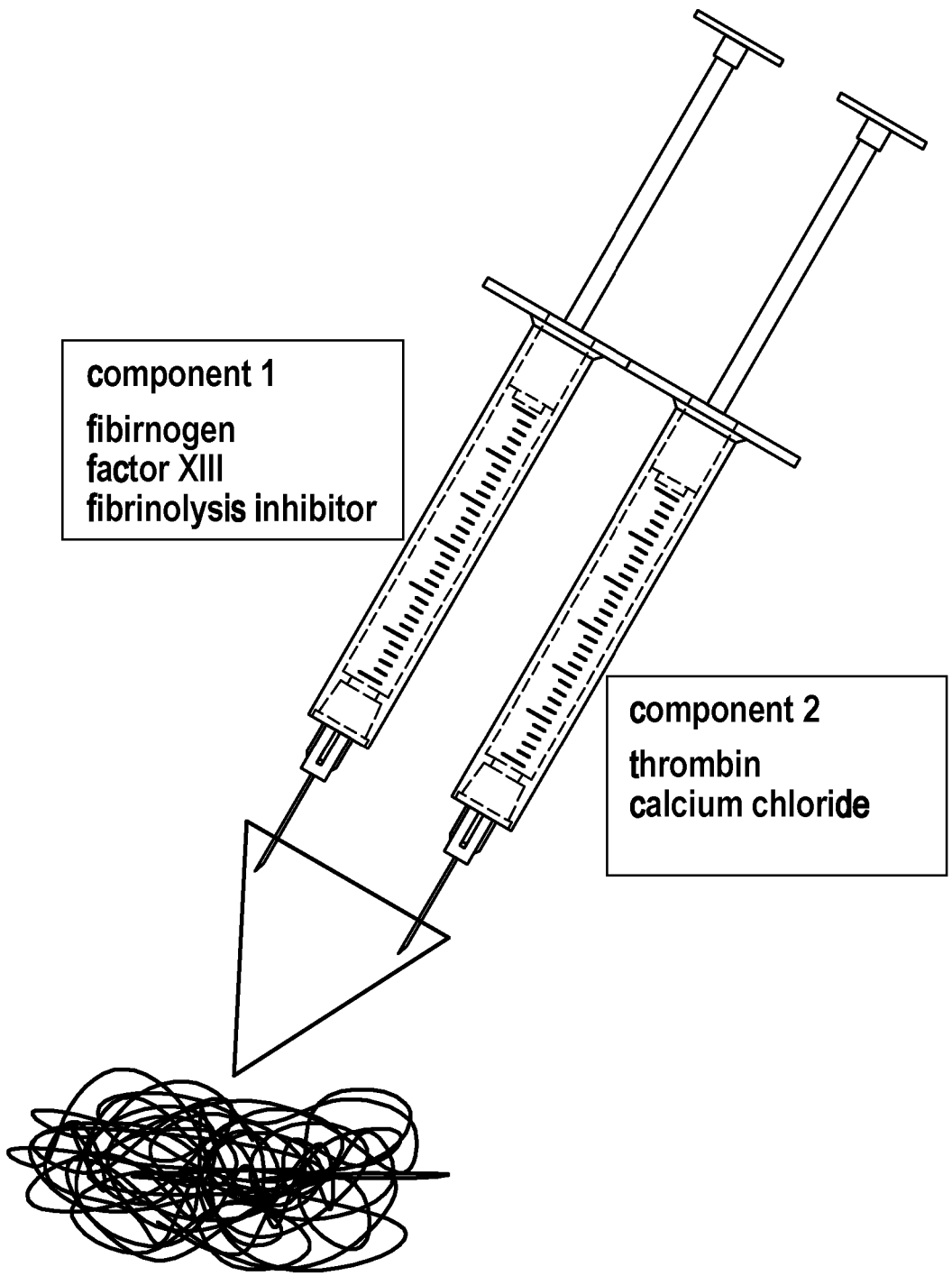

The above-mentioned steps can in principle be carried out with an adhesive 4 which is one-component, that is, only has the first component 41 including the fibrinogen (and any additives disclosed herein), but particularly is free of thrombin. An adhesive 4 which has the first component 41 and a second component 42 which has thrombin can also be used to accelerate the hardening of the adhesive 4. Here, the first and second components 41, 42 (for example, by the device 6 shown in FIG. 3) can be applied together, that is, at the same time, and applied to the X-ray marker 1 and/or in the eyelet 3, or one after the other. It is thus conceivable to first dose the first component 41 and to add the second component 42 at a later point in time in order to accelerate the hardening. A special variant is the parallel separate application.

In the following, further detailed embodiments of the method are to be presented in which the adhesive 4 either only has the first component 41, which has fibrinogen, preferably human fibrinogen, or the first and second components 41, 42, wherein the second component 42 has thrombin, preferably human thrombin. The two components 41, 42 can have the substances and concentrations disclosed herein.

According to a first embodiment, an automatable X-ray marker assembly is provided which uses an immersion process to apply the adhesive 4, which here only has a first fibrinogen-containing component 41 and is thereby free of thrombin. The entire blank 10 (for example, tantalum tube 10 according to FIG. 1) is immersed in the first component 41, here in the form of a fibrinogen-containing solution.

The X-ray marker 1, here preferably made of tantalum, is previously cut from the blank 10 (tantalum tube) by laser cutting technology. In the course of this, it has predetermined breaking points 11 which ensure a material bond with the tube or blank 10 until the X-ray marker is assembled. The automated process control here consists in immersing the entire tube 10 in the first component 41 of the adhesive, a solution of fibrinogen and optionally other constituents, whereby all gaps 12 are completely wetted or filled with the adhesive 4. The scaffold 2 is drawn up on a dilatable balloon which is used to avoid plastic deformation of the scaffold 2. This balloon is pressurized and is pressed into the inner surface of the scaffold 2. It has a coating or surface that acts as a non-stick layer with respect to the adhesive 4. A template-like positioning aid specific for each scaffold design ensures that the eyelet 3 is located exactly under an X-ray marker 1 (see FIG. 1). Subsequently, the X-ray marker 1 is detached from the tube assembly and pressed into the eyelet 3 by a low mechanical pressure, which acts on the X-ray marker surface, for example, via a stamp. The balloon with the scaffold 2 is then guided out of the tantalum tube 10. A necessary hardening phase is very short due to the very rapid hardening of the fibrinogen on the scaffold 2. Finally, the balloon is deflated and pulled out of the scaffold 2. The non-stick layer or surface prevents fibrinogen from being carried over onto the strut surfaces on the inside of the scaffold.

According to a further embodiment, an automatable X-ray marker assembly is also provided, is in which the adhesive 4, which is free of thrombin and has only a first component 41 which contains fibrinogen, is applied by a drop application. The gaps 12 of the blank 10 (for example, tantalum tube) are provided with the first component 41, a fibrinogen-containing solution, by a cannula (for example, in the manner of FIG. 3A with only one container 61 for the first component 41). The X-ray marker 1 is previously cut from the blank 10 by laser cutting technology. In the course of this, it has predetermined breaking points 11 which ensure a material bond with the tubular blank 10 until the X-ray marker is assembled. The automated process control here consists in that the gap 12 between the X-ray marker 1 and the blank 10 is filled with the first component 41 of the adhesive or the adhesive 4 consisting thereof, a solution of fibrinogen and other constituents, from the movable cannula 6, wherein the respective gap 12 is completely wetted or filled with adhesive 4. The scaffold 2 is drawn up on a dilatable balloon which is used to avoid plastic deformation of the scaffold 2. This balloon is pressurized and is pressed into the inner surface of the scaffold 2. It has a coating or surface that acts as a non-stick layer with respect to the adhesive 4. A template-like positioning aid specific for each scaffold design ensures that the eyelet 3 is located exactly under an X-ray marker 1. Subsequently, the X-ray marker 1 is detached from the tube assembly and pressed into the eyelet 3 by a low mechanical pressure, which acts on the X-ray marker surface, for example, via a stamp. The balloon with the scaffold 2 is then guided out of the tantalum tube 10. A necessary hardening phase is very short due to the very rapid hardening of the fibrinogen on the scaffold 2. Finally, the balloon is deflated and pulled out of the scaffold 2. The non-stick layer or surface prevents fibrinogen from being carried over onto the strut surfaces on the inside of the scaffold.

According to a further embodiment, an automatable X-ray marker assembly is provided, in which the adhesive 4, which is free of thrombin and has only a first component 41 which contains fibrinogen, is applied by a drop application. The X-ray marker 1 is cut here from a blank 10 (for example, a tantalum tube) by laser cutting technology. In the course of this, it has predetermined breaking points 11 which ensure a material bond with the tubular blank 10 until the X-ray marker is assembled. The scaffold 2 is drawn up on a dilatable balloon which is used to avoid plastic deformation of the scaffold 2. This balloon is pressurized and is pressed into the inner surface of the scaffold 2. It has a coating or surface that acts as a non-stick layer with respect to the adhesive 4. The process control here consists in providing the eyelet 3 of the scaffold 2 with the first component 41 of the adhesive 4, a solution of fibrinogen and optionally other constituents from a movable cannula 6, wherein the respective eyelet 3 is completely wetted/filled with adhesive 4. The scaffold 2 is then inserted into the tantalum tube 10 while sitting on the balloon. A template-like positioning aid specific for each scaffold design ensures that the eyelet 3 is located exactly under an X-ray marker 1. Subsequently, the X-ray marker 1 is detached from the tube assembly and pressed into the eyelet 3 by a low mechanical pressure, which acts on the X-ray marker surface, for example, via a stamp. The balloon with the scaffold 2 is then guided out of the tantalum tube 10. A necessary hardening phase is very short due to the very rapid hardening of the fibrinogen on the scaffold 2. Finally, the balloon is deflated and pulled out of the scaffold 2. The non-stick layer or surface prevents fibrinogen from being carried over onto the strut surfaces on the inside of the scaffold.

According to a further embodiment, it is provided that an adhesive 4 including a fibrinogen-containing first component 41 and a thrombin-containing second component 42 is used, wherein the blank 10 (for example, tantalum tube) is immersed in the first component 41 or sprayed therewith. The X-ray marker 1 is previously cut from the blank 10 by laser cutting technology. In the course of this, it has predetermined breaking points 11 which ensure a material bond with the tube 10 until the X-ray marker is assembled. The automated process control here consists in immersing the entire tube 10 in the first component 41 of the adhesive 4, a solution of fibrinogen and optionally other constituents (or being sprayed therewith), whereby all gaps 12 are completely wetted/filled with adhesive 4. The scaffold 2 is drawn up on a dilatable balloon which is used to avoid plastic deformation of the scaffold 2. This balloon is pressurized and is pressed into the inner surface of the scaffold 2. It has a coating or surface that acts as a non-stick layer with respect to the adhesive 4. A template-like positioning aid specific for each scaffold design ensures that the eyelet 3 is located exactly under an X-ray marker 1. Subsequently, the X-ray marker is detached from the tube assembly and pressed into the eyelet 3 by a low mechanical pressure, which acts on the X-ray marker surface, for example, via a stamp. The balloon with the scaffold 2 is then guided out of the tantalum tube 10. A necessary hardening phase is very short due to the very rapid hardening of the adhesive on the scaffold 2. The hardening is further intensified by the, preferably separate, addition of the second component 42 of the adhesive 4, which consists of or has thrombin. The balloon is deflated and pulled out of the scaffold 2 after the end of the reaction. The non-stick layer or surface prevents fibrinogen from being carried over onto the strut surfaces on the inside of the scaffold.

According to a further embodiment, an automatable X-ray marker assembly is provided in which the adhesive 4, which has a first component 41 which contains fibrinogen, and a second component 42 which has thrombin, is applied by a drop application. The X-ray marker 1 is cut here from a blank 10 (for example, tantalum tube) by laser cutting technology. In the course of this, the blank 10 has predetermined breaking points 11 which ensure a material bond with the blank or tantalum tube 10 until the X-ray marker is assembled. The automated process control here consists in applying the first component 41 of the adhesive 4, a solution of fibrinogen and optionally other constituents, to the gap 12 between the X-ray marker 1 and the blank 10 (see FIG. 1) by a movable cannula, wherein the respective gap 12 is completely wetted/filled with the first component 41 of the adhesive 4. The scaffold 2 is drawn up on a dilatable balloon which is used to avoid plastic deformation of the scaffold 2. This balloon is pressurized and is pressed into the inner surface of the scaffold 2. It has a coating or surface that acts as a non-stick layer with respect to the adhesive 4. A template-like positioning aid specific for each scaffold design ensures that the eyelet 3 is located exactly under an X-ray marker 1. Subsequently, the X-ray marker 1 is detached from the blank or tube assembly 10 and pressed into the eyelet 3 by a low mechanical pressure, which acts on the X-ray marker surface, for example, via a stamp. The balloon with the scaffold 2 is then guided out of the tantalum tube 10. A necessary hardening phase is very short due to the very rapid hardening of the adhesive 4 on the scaffold 2. The hardening is further intensified by the preferably separate addition of the second component 42 of the adhesive 4, which consists of or has thrombin. The balloon is deflated and pulled out of the scaffold 2 after the end of the reaction. The non-stick layer or surface prevents fibrinogen from being carried over onto the strut surfaces on the inside of the scaffold.

According to a further embodiment, an automatable X-ray marker assembly is provided in which the adhesive 4, which has a first component 41 which contains fibrinogen, and a second component 42 which has thrombin, is applied by a cannula 6. The X-ray marker 1 is cut here from a blank 10 (for example, tantalum tube) by laser cutting technology. In the is course of this, it has predetermined breaking points 11 which ensure a material bond with the blank or tantalum tube 10 until the X-ray marker is assembled. The scaffold 2 is drawn up on a dilatable balloon which is used to avoid plastic deformation of the scaffold 2. This balloon is pressurized and is pressed into the inner surface of the scaffold 2. It has a coating or surface that acts as a non-stick layer with respect to the adhesive 4. The process control here consists in that the eyelet 3 is provided with the first component 41 of the adhesive 4, a solution of fibrinogen and optionally other constituents from a movable cannula 6, wherein the respective eyelet 3 is completely wetted/filled with the first component 41 of the adhesive 4. The scaffold 2 is then inserted into the tantalum tube 10 while sitting on the balloon. A template-like positioning aid specific for each scaffold design ensures that the eyelet 3 is located exactly under an X-ray marker 1. Subsequently, the X-ray marker 1 is detached from the blank or tube assembly 10 and pressed into the eyelet 3 by a low mechanical pressure, which acts on the X-ray marker surface, for example, via a stamp. The balloon with the scaffold 2 is then guided out of the tantalum tube 10. A necessary hardening phase is very short due to the very rapid hardening of the adhesive 4 on the scaffold 2. The hardening is further intensified by the preferably separate addition of the second component 42 of the adhesive 4, which consists of or has thrombin. The balloon is deflated and pulled out of the scaffold 2 after the end of the reaction. The non-stick layer or surface prevents fibrinogen from being carried over onto the strut surfaces on the inside of the scaffold.

Instead of automated X-ray marker assemblies, processes that are essentially carried out manually are of course also conceivable, which are briefly described below as examples for both adhesive variants.

According to a first embodiment, a manual X-ray marker assembly is carried out using an adhesive 4 which has a (first) component 41 containing fibrinogen, but which is otherwise free of thrombin. The scaffold 2 is provided with the first component 41 from a cannula 6, for example, in the region of the eyelet 3. The X-ray marker 1 is cut from a blank 10 (for example, tantalum tube) by laser cutting technology. The process control here consists in that the eyelet 3 is manually provided with the first component 41 of the adhesive 4, a solution of fibrinogen and optionally other constituents from a cannula 6, wherein the is respective eyelet 3 is completely wetted/filled with the adhesive 4. The X-ray marker 1 is then manually brought into the eyelet 3. A necessary hardening phase is very short due to the very rapid hardening of the adhesive 4 on the scaffold 2.

According to a further embodiment, manual X-ray marker assembly is provided, which uses an adhesive 4 having first and second components 41, 42 with separate dosing of both components 41, 42. The scaffold 2 is provided with the components 41, 42 from a cannula 6. The X-ray marker 1 is cut from a blank 10 (for example, tantalum tube) by laser cutting technology. The process control here consists in that the eyelet 3 of the implant 2 is manually provided with the first component 41 of the adhesive 4, a solution of fibrinogen and optionally other constituents, from a cannula 6, so that the respective eyelet 3 is completely wetted/filled with the first component 41 of the adhesive 4. The X-ray marker 1 is then manually brought into the eyelet 3. A necessary hardening phase is very short due to the very rapid hardening of the first component 41 of the adhesive 4 fibrin glue on the scaffold. The hardening is further intensified by the preferably separate addition of the second component 42 of the adhesive 4, which has thrombin or consists of thrombin.

The solution according to the invention is advantageous since it is easily accessible to automation, which results in a corresponding saving of time and a reduction in the reject rate. A reduction in wear is possible due to the lower pressures, which are preferably kept below 5 bar. Furthermore, simple cleaning, for example, using NaOH(aq), of the corresponding components such as the dosing syringes or adhesive storage containers is possible. The adhesive is further a biodegradable component, which promotes the safe retention of the X-ray marker in the tissue.

The invention enables the proportion of non-degradable components to be reduced by replacing the previous X-ray marker adhesive (for example, Nusil). A non-biodegradable silicone adhesive (e.g. Nusil) has been used for this up to now. Due to its biological protein structure, the use of the fibrinogen-containing adhesive enables its own degradation by the body's own processes, so that a non-degradable component can effectively be replaced by a degradable one. This reduces the amount of non-resorbable scaffold constituents (only the X-ray marker itself remains in the body). Furthermore, up to now, it cannot be ruled out that the X-ray marker 1 will detach itself from the scaffold composite after the dilation of the scaffold 2 in the vessel. Patient risk is the result if this occurs at a relatively early point in time at which the X-ray marker or the scaffold region around the X-ray marker has not yet been sufficiently firmly absorbed by the vessel wall. This manifests itself in the fact that the X-ray marker is captured by the blood flow, carried away and can close smaller vascular lumens located behind it. The associated risk of thrombosis increases significantly as a result.

The use of a resorbable, fibrinogen-based adhesive system enables a strong interaction with the body's own tissue, even with free access to the X-ray marker and the adhesive, since the adhesive is a system that closes wound openings and therefore naturally interacts strongly with the wound tissue. As a result, not only is an optionally loosened X-ray marker held on the vessel wall, but also the growth of the X-ray marker into the vessel wall is promoted over all phases of the degradation process of the scaffold. After ingrowth, the fibrin is also resorbed, so that ultimately only the X-ray marker itself remains in the body.

Figure 5:
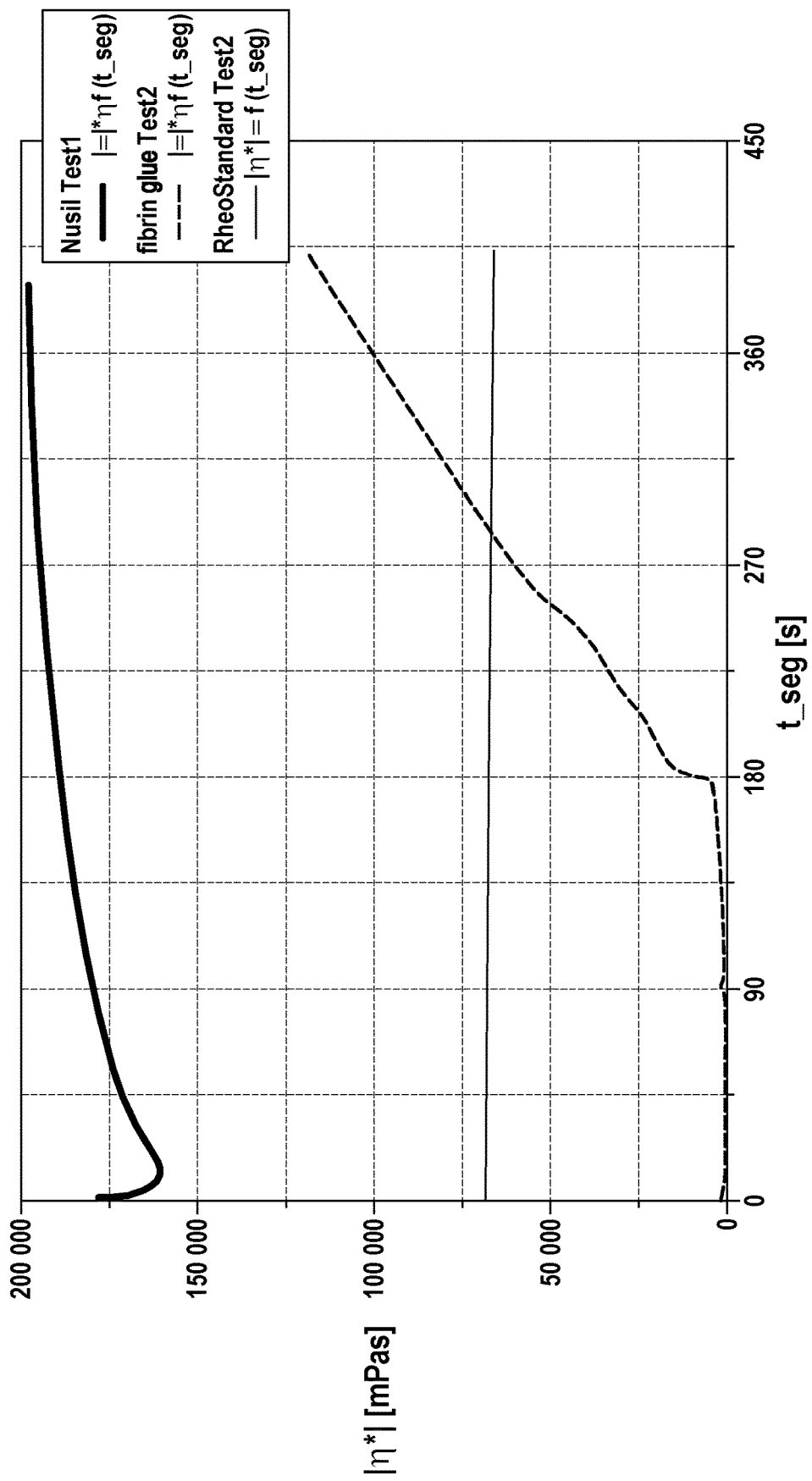
FIG. 5 shows rheological measurement data for Nusil in comparison to an adhesive containing fibrinogen and thrombin (control through a rheometer standard, viscosity: 58880 mPas at 25° C.)
Figure 6:
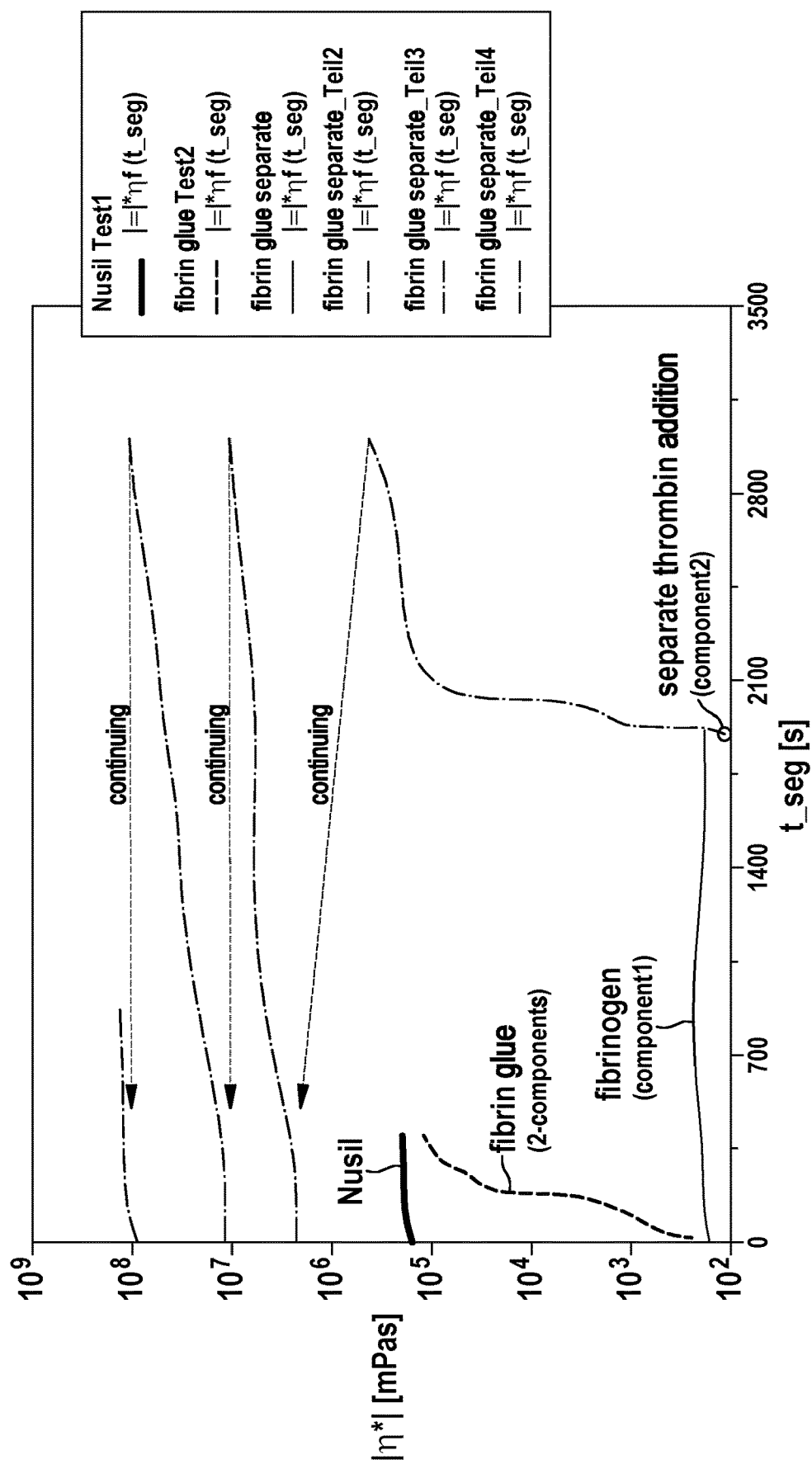
FIG. 6 shows rheological examinations on Nusil in comparison with a fibrinogen-containing adhesive (with thrombin) and the individual components (fibrinogen, thrombin)
Figure 7:
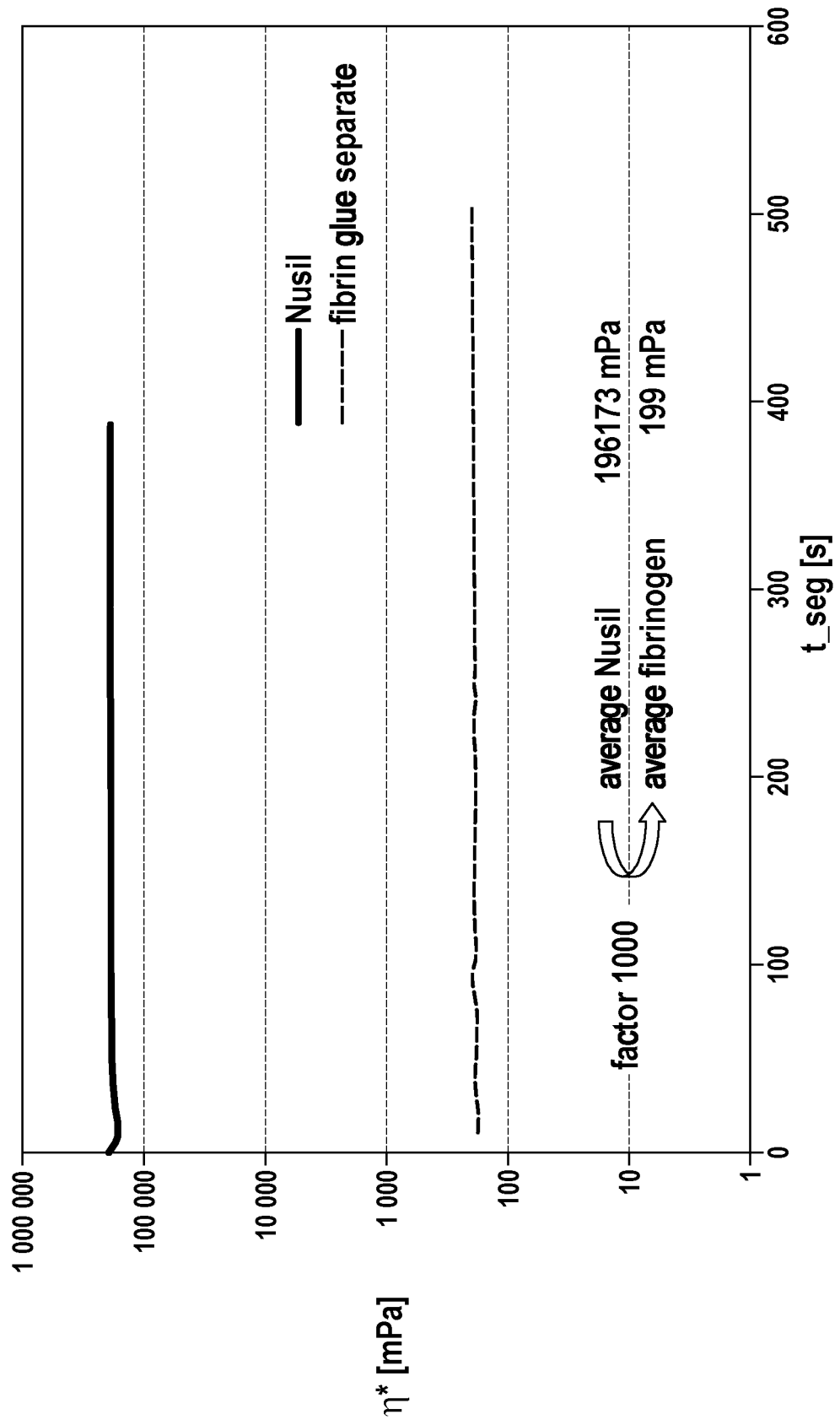
FIG. 7 shows a viscosity comparison between Nusil and fibrinogen.

The adhesive 4 according to the invention, including the fibrinogen-containing first component 41 and optionally also the thrombin-containing second component 42, is distinguished by a comparatively low viscosity, as can be seen from FIGS. 5 to 7. The viscosity can be measured here by manually stirring the adhesive sample for 2 minutes as part of sample preparation immediately before a measurement and by filling a measuring gap with a height of 1 mm with 0.4 mL of adhesive each time (by the Inject-F fine dosing syringe B. Braun Melsungen A G, Melsungen). Oscillatory, shear stress-controlled measurements can serve as measurement parameters, wherein the value of the complex dynamic viscosity is evaluated. The measurements were carried out at a temperature of 25° C., a shear stress of 100 Pa and a frequency of 1 Hz over a measuring time of 10 to 20 minutes using a RheoStress 1 rheometer in combination with a DC 30 cooling unit (Thermo Fisher Scientific Inc., Wallham, USA). The measuring device is a disposable plate-plate system PP20E (Thermo Fisher Scientific Inc., Wallham, USA) having a diameter of 20 mm.

The low viscosity of the adhesive 4, particularly of the first fibrinogen-containing component 41 (see FIGS. 6 and 7) advantageously enables the use of very small cannula inner diameters D, which in turn prevent overdosing beyond the adhesive gap. The small cannula inner diameter D also enables the adhesive 4 to be precisely positioned in the cut edges of the eyelet 3. The drops that arise at the cannula 6 are smaller before they fall off and can be introduced at the target location. The automated dosing, for example, by a pipetting robot/syringe pump, etc. can thus be set more precisely and has shorter process times due to shorter holding times. The use of components coated non-stick with respect to the adhesive 4 enables a low consumption of adhesive 4 and thus a low dosage, even in the course of different automation approaches.

Up to now, gluing in X-ray markers has been solved, for example, with the aid of a medically approved, biocompatible but non-resorbable silicone adhesive NUSIL MED 2-4213 (Nusil for short). Under the specific processing conditions (room temperature), this has a relatively high dynamic viscosity (see, for example, FIGS. 5 to 7). Decisive disadvantages in the processing are the result. These express themselves, among other things, in a more difficult dosing.

Due to the technologically demanding micro-geometry of the scaffold environment (eyelet 3), which is provided for fixing the X-ray marker, the adhesive is preferably applied by cannulas 6, which are preferably characterized by very small internal diameters in the range of 100 μm (<30 G). The smallest possible cannula inner diameter D of <100 μm would be desirable in order to avoid undesirable overdosing of the X-ray marker environment with adhesive. However, due to the high processing viscosity of the silicone adhesive, this cannot be used for rheological reasons. Too much rather than too little adhesive is applied in order to still achieve a sufficiently high adhesive effect. Overdosing, which can hardly be avoided from a technological point of view, and the adhesive emerging from the adhesive joint are the result.

In contrast, the small cannula inner diameter D of the present invention enables the adhesive to be precisely positioned at the corresponding locations (see above).

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims

The invention claimed is:

1. A method for connecting an X-ray marker to a medical implant, comprising the steps of:
   providing the medical implant having an opening configured to receive the X-ray marker,
   providing the X-ray marker, and
   gluing the X-ray marker into the opening of the medical implant with a liquid adhesive that comprises at least one first component comprising a fibrinogen, wherein
   the step of providing the X-ray marker comprises cutting the X-ray marker from a blank so that at least one gap is produced in the blank, wherein the at least one gap separates the X-ray marker from the blank, and such that the X-ray marker is connected to the blank via at least one predetermined breaking point,
   the step of providing the medical implant comprises arranging the medical implant on a dilatable balloon and pressurizing the balloon so that an outer surface of the balloon presses against an inner surface of the medical implant, and
   the step of gluing in the X-ray marker further comprises arranging the balloon with the medical implant arranged thereon in the blank so that the opening of the medical implant is opposite the X-ray marker and pressing the X-ray marker into the opening while cutting through the at least one predetermined breaking point, so that the X-ray marker is arranged in the opening of the medical implant.

2. The method according to claim 1, wherein the step of providing the X-ray marker comprises separating the X-ray marker from a blank.

3. The method according to claim 1, wherein the step of gluing further comprises applying the at least one first component to the medical implant in a region of the opening and then arranging the X-ray marker in the opening.

4. The method according to claim 1, wherein the step of gluing further comprises applying the at least one first component to the medical implant through a cannula.

5. The method according to claim 1, wherein the step of gluing the X-ray marker further comprises one of the following: applying the at least one first component to the blank by immersing the blank in the at least one first component, applying the adhesive into the at least one gap, or applying the adhesive into the opening of the medical implant.

6. The method according to claim 1, wherein the medical implant is a vascular implant.

7. The method according to claim 6, wherein the vascular implant is made of a resorbable magnesium alloy.

8. The method according to claim 1, wherein the adhesive comprises a second component comprising a thrombin.

9. The method according to claim 8, wherein the second component is applied together with the at least one first component, or wherein the second component is added to the at least one first component after the X-ray marker has been arranged in the opening to accelerate hardening of the adhesive.

10. The method according to claim 9, wherein the at least one first component is applied together with the second component via a first cannula, the second component is added to the at least one first component via a second cannula, or the at least one first component is applied parallel to the second component via the first and second cannulas.

11. The method according to claim 10, wherein the first and second cannulas comprise an opening which has an inner diameter (D) which lies in a range of 50 to 120 μm.

12. The method according to claim 1, wherein the adhesive is free of thrombin.

13. The method according to claim 1, wherein the separating comprises laser cutting the X-ray marker from the blank.

14. A method for connecting an X-ray marker to a medical implant, comprising the steps of:
   providing the medical implant having an opening configured to receive the X-ray marker,
   providing the X-ray marker, and
   gluing the X-ray marker into the opening of the medical implant with a liquid adhesive that comprises at least one first component comprising a fibrinogen, wherein
   the step of providing the X-ray marker comprises cutting the X-ray marker from a blank so that at least one gap is produced in the blank, wherein the at least one gap separates the X-ray marker from the blank, and such that the X-ray marker is connected to the blank via at least one predetermined breaking point,
   the step of providing the medical implant comprises arranging the medical implant on a dilatable balloon and pressurizing the balloon so that an outer surface of the balloon presses against an inner surface of the medical implant, and wherein the balloon is deflated and guided out of the medical implant after the adhesive has hardened.

* * * * *